United States Patent
Voss et al.

(10) Patent No.: US 9,976,282 B2
(45) Date of Patent: May 22, 2018

(54) CONSTRUCTION MACHINES AND FUEL TANKS FOR CONSTRUCTION MACHINES

(71) Applicant: CATERPILLAR INC., Peoria, IL (US)

(72) Inventors: Sven Voss, Regensburg (DE); Thomas Mann, Schwandorf (DE); Josef Woess, Weihmichl (DE); Martin Pfab, Wernber-Koblitz (DE)

(73) Assignee: Caterpillar Inc., Deerfield, IL (US)

( * ) Notice: Subject to any disclaimer, the term of this patent is extended or adjusted under 35 U.S.C. 154(b) by 566 days.

(21) Appl. No.: 14/408,706

(22) PCT Filed: Jun. 26, 2013

(86) PCT No.: PCT/US2013/047916
§ 371 (c)(1),
(2) Date: Dec. 17, 2014

(87) PCT Pub. No.: WO2014/004685
PCT Pub. Date: Jan. 3, 2014

(65) Prior Publication Data
US 2015/0191896 A1    Jul. 9, 2015

(30) Foreign Application Priority Data
Jun. 27, 2012   (EP) .................................. 12173942

(51) Int. Cl.
*B60K 15/063*        (2006.01)
*E02F 9/08*          (2006.01)
(Continued)

(52) U.S. Cl.
CPC .......... *E02F 9/0883* (2013.01); *B60K 15/035* (2013.01); *B60K 15/063* (2013.01);
(Continued)

(58) Field of Classification Search
CPC .. B60K 2015/03118; B60K 2015/0312; B60K 2015/03131; B60K 2015/03144;
(Continued)

(56) References Cited

U.S. PATENT DOCUMENTS 5,392,804 A * 2/1995 Kondo ............. B60K 15/03519
                                                123/519
6,659,122 B1 * 12/2003 Zahdeh .................. B60K 15/00
                                                137/256
(Continued)

FOREIGN PATENT DOCUMENTS

CN        1833903       9/2006
CN        101182852     5/2008
(Continued)

OTHER PUBLICATIONS

International Search Report dated Aug. 27, 2013.
European Search Report dated Mar. 8, 2013.

*Primary Examiner* — Anne Marie M Boehler

(57) ABSTRACT

Leveled fuel levels in a fuel tank disposed at an undercarriage of a construction machine may ensure that the total fuel volume of the fuel tank may be accessible. The fuel tank may include a first fuel compartment and a second fuel compartment fluidly connected to the first fuel compartment and disposed at higher altitudes than the first fuel compartment. Furthermore, the fuel tank may include at least one step integrally formed with the first fuel compartment or second fuel compartment for facilitating entrance to an operator station of the construction machine.

10 Claims, 3 Drawing Sheets

(51) Int. Cl.
*B60K 15/077* (2006.01)
*B60K 15/035* (2006.01)
*B60K 15/03* (2006.01)

(52) U.S. Cl.
CPC ...... *B60K 15/077* (2013.01); *B60K 15/03006* (2013.01); *B60K 2015/03118* (2013.01); *B60K 2015/03125* (2013.01); *B60K 2015/03144* (2013.01); *B60K 2015/03523* (2013.01); *B60K 2015/0634* (2013.01); *B60Y 2200/412* (2013.01); *Y10T 137/0318* (2015.04)

(58) Field of Classification Search
CPC ........... B60K 2015/03151; B60K 2015/03171; B60K 2015/0631; B60K 2015/0634; B60K 15/073
USPC ....................... 280/163, 164.1, 169, 830, 831
See application file for complete search history.

(56) References Cited

U.S. PATENT DOCUMENTS

| | | | | |
|---|---|---|---|---|
| 6,789,568 | B1 * | 9/2004 | Bunnell | B60K 15/03 137/265 |
| 8,672,338 | B2 * | 3/2014 | Ringer | F16J 12/00 172/431 |
| 2001/0025629 | A1 * | 10/2001 | Kiowsky | F02M 37/0023 123/510 |
| 2003/0116192 | A1 | 6/2003 | Svendsen et al. | |
| 2010/0258364 | A1 * | 10/2010 | Bolz | B60K 15/063 180/9.1 |
| 2011/0018308 | A1 * | 1/2011 | Uto | E02F 9/00 296/181.1 |
| 2016/0089974 | A1 * | 3/2016 | Tanigawa | B60K 15/063 280/834 |
| 2016/0129783 | A1 * | 5/2016 | Tamura | B60K 15/067 180/344 |

FOREIGN PATENT DOCUMENTS

| | | |
|---|---|---|
| CN | 101864784 | 10/2010 |
| DE | 4219803 | 12/1993 |
| DE | 19618454 | 11/1997 |
| DE | 202009005597 U1 | 10/2010 |
| GB | 2360826 | 10/2001 |
| JP | 8-67156 | 3/1996 |
| JP | 2007-231805 | 9/2007 |
| WO | WO 2008/105721 | 9/2008 |
| WO | WO 2014/004685 | 1/2014 |

* cited by examiner

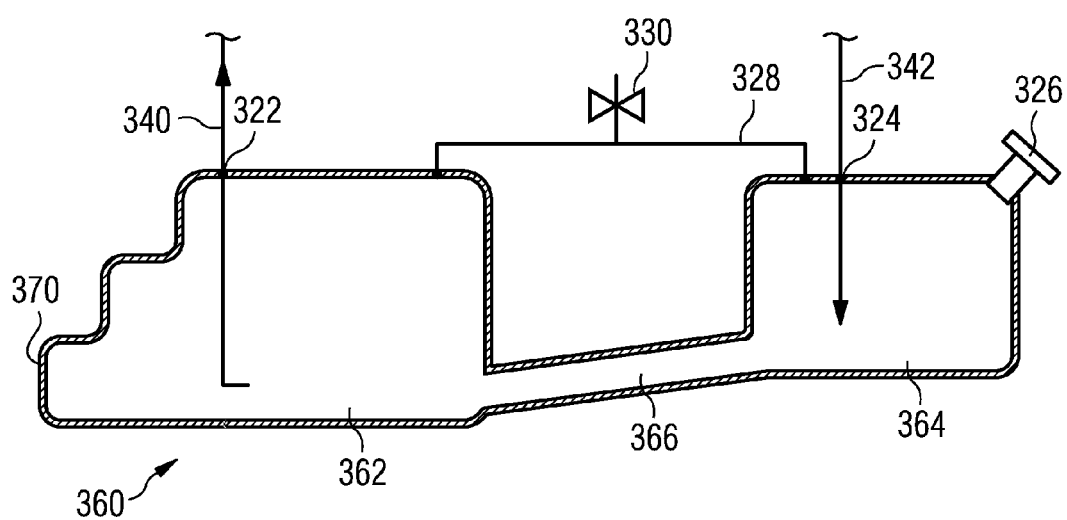

US 9,976,282 B2

CONSTRUCTION MACHINES AND FUEL TANKS FOR CONSTRUCTION MACHINES

CLAIM FOR PRIORITY

This application is a U.S. National Phase entry under 35 U.S.C. § 371 from PCT International Application No. PCT/US2013/047916, filed Jun. 26, 2013, which claims benefit of priority of European Patent Application No. 12173942.9, filed Jun. 27, 2012, all of which are incorporated herein by reference.

TECHNICAL FIELD

The present disclosure generally refers to fuel tanks for construction machines, and more particularly to fuel tanks comprising a first fuel compartment and a second fuel compartment.

Furthermore, the present disclosure refers to a fuel tank for a construction machine, particularly to a fuel tank being capable of facilitating entering an operator station of the construction machine.

BACKGROUND

Construction machines, such as self-propelled excavators, having a hydrostatic drive are generally used for heavy labour. It is common to provide a construction machine having an undercarriage and a superstructure rotatably mounted onto the undercarriage with a fuel tank disposed at the undercarriage.

Fuel tanks usually serve as apparatuses for storing fuel which may be combusted within cylinders of internal combustion engines. Particularly, the internal combustion engines may be used at construction machines for driving the hydraulic system. It is common that construction machines may be hydraulically driven. The mechanical power may be provided by the internal combustion engine running on, for example, liquid fuel such as diesel fuel.

For example, U.S. Pat. No. 6,607,005 B2 discloses a fuel tank comprising a saddle tank configuration. A first of the chambers contains a fuel delivery unit and a second of the chambers has a refueling vent valve which is the only refueling vent valve of the tank. The two chambers also communicate with each other by way of a compensating line on the basis of the principle of communicating vessels.

Furthermore, a construction machine having an undercarriage comprising a hollow frame, a superstructure mounted on the undercarriage and a fuel tank formed as one with the hollow frame is known from U.S. Pat. No. 6,905,139 B2. The internal surface of the fuel tank is covered with a resin film in a liquid tight condition. The fuel tank may also comprise a plurality of tank sections being in fluid communication with each other via a plurality of holes.

US 2010/0258364 A1 discloses an excavator having an undercarriage, a superstructure and two fuel containers arranged at the undercarriage. Both fuel containers comprise each a filler neck for filling the fuel containers with fuel.

The present disclosure is directed, at least in part, to improving or overcoming one or more aspects of prior systems.

SUMMARY OF THE DISCLOSURE

According to an aspect of the present disclosure a construction machine may comprise an undercarriage, a superstructure comprising an internal combustion engine, a swivel configured to rotatably mount the superstructure onto the undercarriage, and a first fuel tank disposed at the undercarriage. The first fuel tank may comprise a first fuel compartment defining a first convex volume including a most lower point. The first fuel compartment may be configured to provide fuel to the internal combustion engine. The first fuel tank may further comprise a second fuel compartment defining a second convex volume including a most lower point. The second fuel compartment may be configured to receive excessive fuel from the internal combustion engine and may be disposed beside the first fuel compartment, such that the most lower point of the second convex volume may be at higher altitudes than the most lower point of the first convex volume. The first fuel tank may further comprise a fuel passage configured to fluidly connect the most lower point of the second convex volume to the first convex volume, such that fuel within the second fuel compartment may be enabled to drain out of the second fuel compartment into the first fuel compartment.

According to another aspect of the present disclosure, a method for providing fuel to an internal combustion engine of a construction machine comprising an undercarriage, a superstructure supporting the internal combustion engine, a swivel configured to rotatably mount the superstructure onto the undercarriage, and a first fuel tank disposed at the undercarriage may comprise supplying fuel from a first fuel compartment of the first fuel tank to the internal combustion engine. The first fuel compartment may define a first convex volume including a most lower point. The method may further comprise supplying excessive fuel from the internal combustion engine to a second fuel compartment of the first fuel tank. The second fuel compartment may define a second convex volume including a most lower point and may be disposed beside the first fuel compartment, such that the most lower point of the second convex volume may be at higher altitudes than the most lower point of the first convex volume. The method may further comprise fluidly connecting the most lower point of the second fuel compartment to the first fuel compartment via a fuel passage, such that fuel within the second fuel compartment may be enabled to drain out of the second fuel compartment into the first fuel compartment.

According to another aspect of the present disclosure, a fuel tank may be configured to be mounted in a construction machine comprising an internal combustion engine and an operator station. The fuel tank may comprise at least one fuel compartment defining a convex volume and configured to provide fuel to the internal combustion engine. The fuel tank may further comprise at least one step integrally formed with the at least one fuel compartment. The at least one step may be configured to facilitate entrance to the operator station.

In some embodiments, the fuel passage may be configured to fluidly connect the most lower point of the second convex volume of the second fuel compartment to the most lower point of the first convex volume of the first fuel compartment.

In some embodiments, the first fuel compartment may comprise a first height, and the second fuel compartment may comprise a second height being smaller than the first height.

In some embodiments, the second convex volume of the second fuel compartment may be smaller than the first convex volume of the first fuel compartment.

In some embodiments, the exemplary disclosed construction machine may further comprise a vent line fluidly connected to most upper points of the first fuel compartment and the second fuel compartment, and a vent valve disposed at the vent line. The vent valve may be configured to vent the first fuel compartment and the second fuel compartment.

In some embodiments, the construction machine may further comprise a second fuel tank disposed at the superstructure and being fluidly interconnected between the first fuel tank and the internal combustion engine.

In some embodiments, the second fuel tank may comprise a first fuel partition defining a first convex volume including a most upper point. The first fuel partition may be configured to provide fuel having a first fuel temperature to the internal combustion engine. The second fuel tank may further comprise a second fuel partition defining a second convex volume including a most upper point. The second fuel partition may be disposed above the first fuel partition and may be configured to receive excessive fuel from the internal combustion engine. The excessive fuel may have a second fuel temperature being higher than the first fuel temperature. The second fuel tank may further comprise a fluid passage configured to fluidly connect the most upper point of the first fuel partition to the most upper point of the second fuel partition.

In some embodiments, the exemplary disclosed method may further comprise supplying fuel from the first compartment of the first fuel tank to a second fuel tank disposed at the superstructure, and supplying excessive fuel from the second fuel tank to the second fuel compartment of the first fuel tank.

Other features and aspects of this disclosure will be apparent from the following description and the accompanying drawings.

BRIEF DESCRIPTION OF THE DRAWINGS

FIG. 3 is a diagrammatic cross-sectional view of another embodiment of the first fuel tank of FIG. 2 according to an exemplary disclosed embodiment.

DETAILED DESCRIPTION

Figure 1:
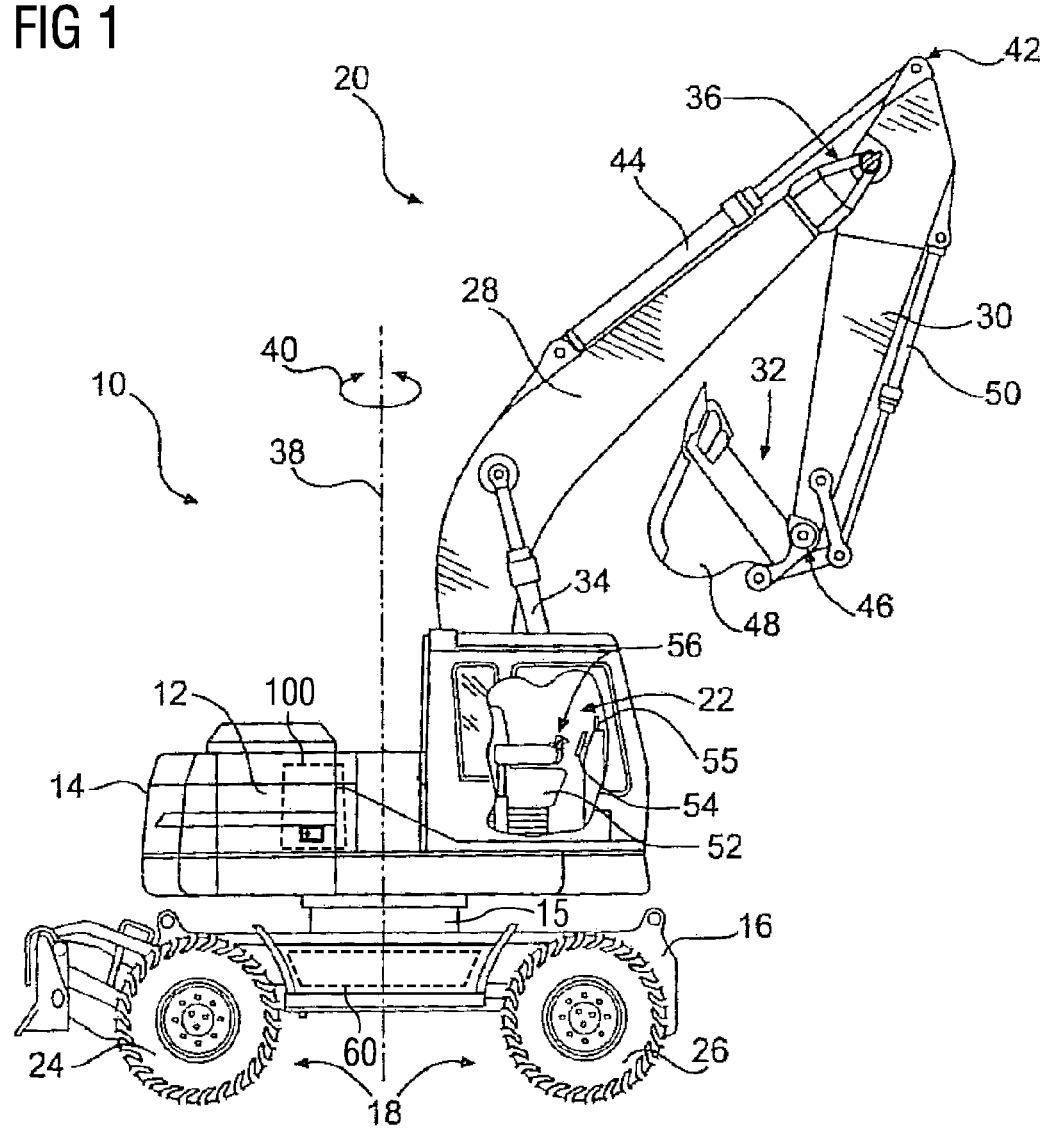
FIG. 1 is a diagrammatic illustration of a construction machine comprising a fuel tank according to an exemplary disclosed embodiment.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of protection. Rather, the scope of patent protection shall be defined by the appended claims.

The present disclosure may be based in part on the realization that a construction machine may comprise a fuel tank disposed at an undercarriage of the construction machine. The fuel tank may comprise a first fuel compartment and a second fuel compartment being disposed beside the first fuel compartment and at higher altitudes than the first fuel compartment. The second fuel compartment may be fluidly connected to the first fuel compartment, such that fuel within the second fuel compartment may drain into the first fuel compartment due to gravitational forces. This may compensate different fuel levels within the first and second fuel compartments and may ensure that the total fuel volume of the fuel tank may be accessible from the first fuel compartment.

As used herein, a "convex volume" may be any three-dimensionally shaped volume being capable of guiding the liquid fuel contained within the convex volume to its most lower point. It should be understood that the convex volume may enable the liquid fuel to freely flow to a single most lower point without being trapped. For example, a volume having a stepped side wall configuration, even a partially concave portion, or a combination thereof may be also referred to as a "convex volume" as such a design may also enable liquid fuel to freely flow to the single most lower point of the convex volume without being trapped in other lower points of part volumes.

Furthermore, the term "inclined" should include any configuration which comprises a strictly monotonically increasing shape. This may not limit, for example, an inclined wall to a wall having a planar surface. Rather, an "inclined wall" may also include a wall having a strictly monotonically increasing cross-sectional profile which may support in guiding liquid fuel to the most lower points of the first and second fuel compartments. Additionally, an "inclined" element may include an inclination of an appropriate angle to a horizontal axis which may ensure liquid fuel or gaseous fluids to flow down or rise to a most lower or most upper point of a convex volume, respectively.

The present disclosure may be further based in part on the realization that a fuel tank disposed at an undercarriage of a construction machine may comprise at least one step integrally formed with at least one fuel compartment of the fuel tank. The at least one step may be configured to facilitate entrance for an operator to enter the operator station, from where the operator controls the construction machine.

Reference will now be made in detail to the drawings. Wherever possible, the same reference numeral will be used throughout the drawings to refer to the same or like parts.

Referring to FIG. 1, a construction machine 10 as, for example, a wheel excavator is shown. The construction machine 10 may include a power source, such as the internal combustion engine 12. The construction machine 10 may further include a superstructure 14 which may be operably attached to an undercarriage 16.

The construction machine 10 may also include a traction system 18, for instance a plurality of wheels, which may be operably attached to the undercarriage 16. In addition, the construction machine 10 may include a work implement 20 and an operator station 22 from which the work implement 20 may be controlled.

The construction machine 10 shown in FIG. 1 as a wheel excavator may be any type of work machine with operator-controlled steering and travelling. For example, the construction machine 10 may include wheel loaders, motor graders, backhoe loaders, skid steers, track-type tractors, tracked excavators, material handlers, cranes, and any other type of work machine with operator-controlled steering and travelling.

The superstructure 14 may be fixedly mounted onto the undercarriage 16. Alternatively, the superstructure 14 may be rotatably mounted onto the undercarriage 16 via a swivel 15. As another alternative, the superstructure 14 may be mounted to the undercarriage 16 in a suitable fashion or any other configuration.

In addition, the construction machine 10 may include a cab-raiser function, by which the superstructure 14 may be raised and lowered relative to the undercarriage 16. Alternatively or additionally, the cab-raiser function may cause the operator station 22 to be raised and lowered relative to the superstructure 14. The cab-raiser function may be hydraulically actuated.

The traction system 18 may include at least one traction device, such as, for example, a first set of wheels 24 and a second set of wheels 26, as shown in FIG. 1. At least one set of wheels may be steerable. The construction machine 10 may be configured with two-wheel or four-wheel steering. Further, a steering configuration may be selectable between two-wheel and four-wheel steering, or the operator may switch which set of wheel is steerable.

While the traction system 18 has been shown to include wheels, the present disclosure may also apply to work machines or vehicles with one or more endless tracks and/or belts, or any other type of traction device. In addition, the present disclosure may apply to steering systems that vary a steering angle of one or more traction devices, as well as skid steer, and differential steering systems. Further, these systems may each apply to work machines with a variety of types of tracks and devices. For example, while track work machines are commonly configured with skid-steer or differential steering systems, they may automatically or additionally be configured with steering systems that vary a steering angle of one or more tracks. Similarly, wheeled work machines or vehicles may steer with a variable steering angle system, skid-steer, and/or differential steering systems.

The work implement 20 may be any type of work implement and may include any type of work tool, such as, for instance, a bucket, blade, grapple, jackhammer, shears, etc.

As shown in FIG. 1, the work implement 20 may include a boom 28, a stick 30, and a work tool 32 attached to the end of the stick 30. The boom 28 may be pivotably attached to the superstructure 14. A boom actuator 34 may be attached to the superstructure 14 and the boom 28, such that a distal end 36 of the boom 28 may be raised and lowered by actuation of the boom actuator 34.

The distal end 36 of the boom 28 may also be moved side-to-side. In the exemplary embodiment shown, the boom 28 may be moved side-to-side by rotation of the superstructure 14 relative to the undercarriage 16 about an axis 38 in a direction indicated by an arrow 40. For purposes of this disclosure, the side-to-side movement of the work implement 20 via rotational movement of the superstructure 14 relative to the undercarriage 16 shall be referred to as "swing". The construction machine 10 may also include an offset boom function by which the boom 28 may be pivoted side-to-side relative to the superstructure 14.

The stick 30 may be pivotably attached to the boom 28 at a proximal end 42. A stick actuator 44 may be attached to the boom 28 and the stick 30 such that actuation of the stick actuator 44 may cause the stick 30 to extend and retract with respect to the boom 28 in a manner of a jackknife. That is, a distal end 46 of the stick 30 may be extended further away from the undercarriage 12, and retract closer to the undercarriage 16 by actuating the stick actuator 44.

The work tool 32 may be attached to the distal end 46 of the stick 30. While the work tool 32 has been illustrated in FIG. 1 as a bucket 48, the work tool 32 may be any type of work tool. The work tool 32 may be pivotably attached to the distal end 46 of the stick 30. A work tool pivot actuator 50 may be attached to the stick 30 and the work tool 32 such that actuation of the work tool pivot actuator 50 may cause the work tool 32 to pivot relative to the stick 30.

The operator station 22 may be a cab as illustrated in FIG. 1, and may be attached to or integral with the superstructure 14. The operator station 22 may include an operator seat 52, a first steering device, such as, for example, a steering wheel 54, a display 55, and at least one-hand operated work implement control device 56, for instance, a joystick. The steering wheel 54 may be operatively coupled to a first set of wheels 24 and/or a second set of wheels 26 so as to control their directional movement. The steering wheel may tilt and/or telescope relative to the operator seat 52 in order to facilitate ingress and egress, or to provide a more opened cab while operating other control devices. For example, steering wheel 54 may be tilted and/or telescoped out of the way while a secondary steering control system is active. The construction machine 10 may include two work implement control devices, one on each side of the operator seat 52.

The work implement control device 56 may control multiple functions of the construction machine 10, as, for example, operation of the work implement 20 (including movements of the boom 28, the stick 30 and the work tool 32), swing, propulsion of the construction machine 10, steering, the cab-raiser function, the offset boom function, etc.

The boom actuator 34, the stick actuator 44, and the work tool pivot actuator 50 may be any kind of actuators, such as, for instance, hydraulic cylinders as shown in FIG. 1. Each hydraulic cylinder may be associated with its own hydraulic circuit in order to be independently controlled. Some work tools, such as the bucket 48, may have a single actuator, and thus may be controlled by a single hydraulic circuit. Other type of work tools, such as grapple may include more than one actuator, and thus may be controlled by more than one hydraulic circuit. For example, grapple may be controlled by two or more hydraulic circuits. One circuit may control the work tool pivot actuator 50, which may pivot the grapple in the same manner as it does the bucket 48. Additionally, a second circuit may control an auxiliary function, such as rotation of the grapple.

One or more of the boom actuator 34, the stick actuator 44, the work tool pivot actuator 50 and all the others, like hydraulic cylinders, may be driven by one or more hydraulic circuits.

The construction machine 10 may further comprise a first fuel tank 60 disposed at the undercarriage 16. The first fuel tank 60 may serve as the main fuel tank being configured to store the majority of fuel to be combusted by the internal combustion engine 12.

In some embodiments, the construction machine 10 may further comprise a second fuel tank 100 being disposed at the superstructure 14. The second fuel tank 100 may be fluidly interconnected between the first fuel tank 60 and the internal combustion engine 12. The second fuel tank 100 may serve as a kind of fuel accumulator configured to buffer fuel (which may be described in detail below).

Figure 2:
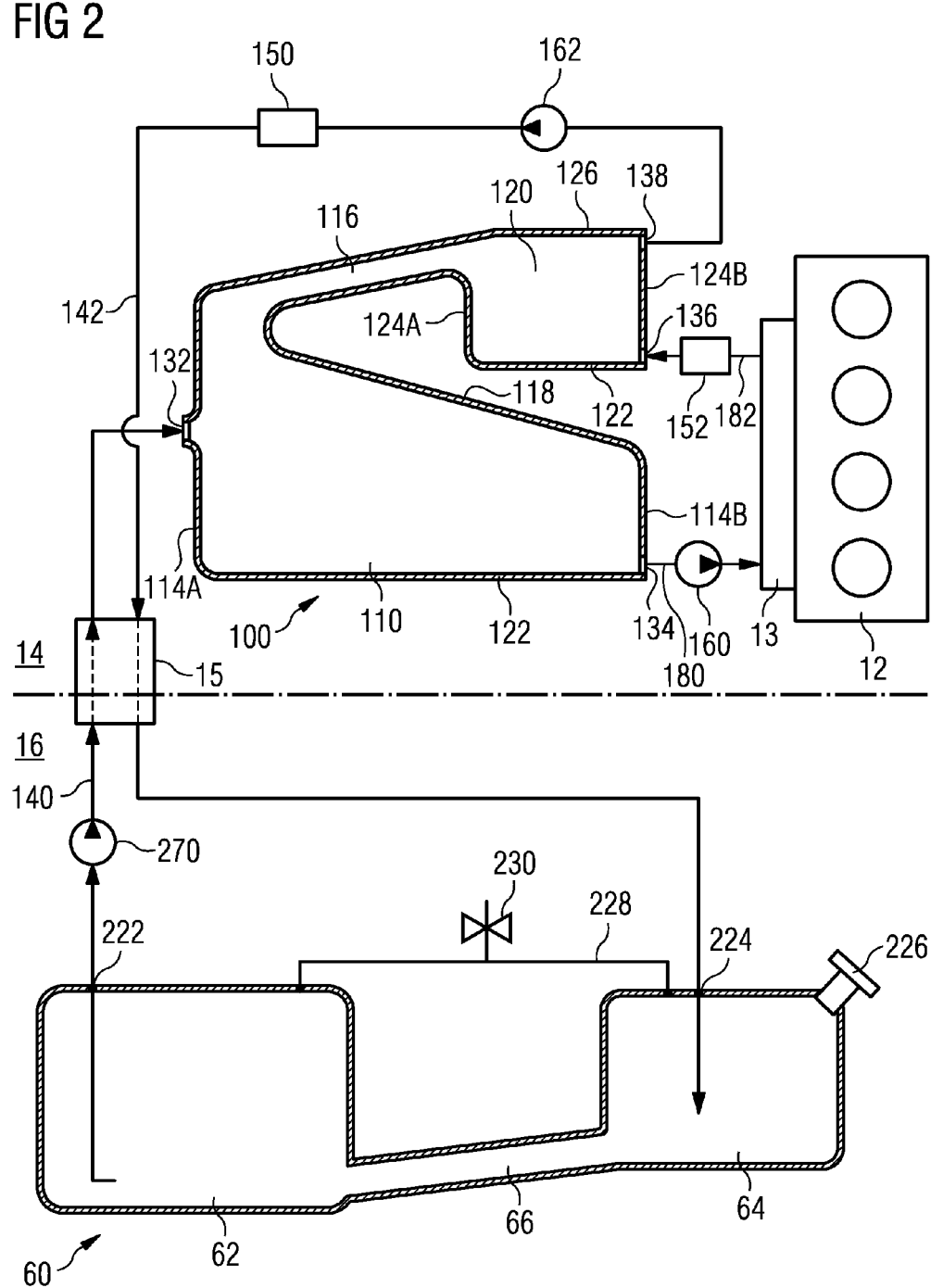
FIG. 2 is a diagrammatic illustration of the construction machine of FIG. 1 showing a fuel system according to an exemplary disclosed embodiment.

Referring to FIG. 2, a schematic view of the construction machine 10 having the first fuel tank 60 disposed at the undercarriage 16 is shown. The superstructure 14 may be rotatably mounted to the undercarriage 16 via the swivel 15. The dash-dot line of FIG. 2 may indicate a partition between the superstructure 14 and the undercarriage 16.

The first fuel tank 60 may comprise a first fuel compartment 62 defining a first convex volume including a most lower point, and a second fuel compartment 64 defining a second convex volume also including a most lower point. The second fuel compartment 64 may be disposed beside the first fuel compartment 62. Furthermore, the most lower point of the second fuel compartment 64 may be disposed superior to the most lower point of the first fuel compartment 62, i.e. the most lower point of the second fuel compartment 64 may be disposed at higher altitudes than the most lower point of the first fuel compartment 62.

The first fuel compartment 62 may be fluidly connected to the second fuel compartment 64 via a fuel passage 66. The fuel passage 66 may be configured to fluidly connect the most lower point of the second convex volume of the second fuel compartment 64 to the first fuel compartment, such that fuel within the second fuel compartment 64 may be able to drain into the first fuel compartment 62 due to, for example, the gravitational force. The fuel passage 66 may, therefore, be configured to level the fuel amounts of the first and second fuel compartments 62 and 64.

In some embodiments, the first fuel compartment 62, the second fuel compartment 64, and the fuel passage 66 may form together a one-piece fuel tank 60.

The first and second fuel compartments 62 and 64 are shown in FIG. 2 in a manner, where the upper surface of the first compartment 62 may be at a same level as the upper surface of the second fuel compartment 64. Thus, for enabling fuel to drain out of the second fuel compartment 64, the height of the second fuel compartment 64 may be smaller than the height of the first fuel compartment 62.

In some embodiments, the first and second fuel compartments 62 and 64 may comprise the same height. Hence, the upper surfaces of the first and second fuel compartments 62 and 64 may not be at the same level, i.e. the upper surface of the second fuel compartment 64 may be higher than the upper surface of the first fuel compartment 62.

As shown in FIG. 2, the fuel passage 66 may be provided in an inclined manner. This may ensure the fuel within the second fuel compartment 62 to freely drain from the second fuel compartment 64 into the first fuel compartment 62. In some embodiments, the fuel passage 66 may be configured to fluidly connect the most lower point of the second convex volume of the second fuel compartment 64 to the most lower point of the first convex volume of the first fuel compartment 62.

In some embodiments, the second convex volume of the second fuel compartment 64 may be substantially smaller than the first convex volume. For example, the second convex volume of the second fuel compartment 64 may be equal to about 90% or less of the first convex volume of the first fuel compartment 62, and equal to about 60% or more of the first convex volume of the first fuel compartment 62. For instance, the first fuel compartment 62 may comprise a first convex volume of about 250 l, whereas the second fuel compartment 64 may comprise a second convex volume of about 150 l.

The fuel passage 66 may include a cuboid shape. For instance, the fuel passage 66 may also include any other suitable cross-section, such as a circular cross-section, a rectangular cross-section, an oval cross section, etc. However, the fuel passage 66 may be further provided in any suitable inclined shape which may ensure liquid fuel to completely flow form the second fuel compartment 64, through the fuel passage 66 and into the first fuel compartment 62.

The flowing speed of the fuel draining from the second fuel compartment into the first fuel compartment may be controlled by adjusting the diameter of the fuel passage 66 and/or by adjusting the angle of inclination of the fuel passage 66.

The second fuel compartment 64 may be provided with a filler neck 226 for refueling the second fuel compartment 64 and, more specifically, the first fuel tank 60 with fuel. The first fuel compartment 62 may further be fluidly connected to the second fuel compartment 64 via a vent line 228. The vent line 228 may be connected to most upper points of the first and second convex volumes of the first and second fuel compartments 62 and 64, respectively. The vent line 228 may be further connected to a vent valve 230 configured to release gaseous fluids out of the first fuel tank 60. The vent line 228 may be easily installed with quick connectors, crimp connectors, threaded ports, or any other suitable connection known in the art.

As indicated in FIG. 2, the first and second fuel compartments 62 and 64 may be arranged at the undercarriage 16 of the construction machine 10. The first fuel compartment 62 may be arranged between the first and second set of wheels 24 and 26 on a first side of the swivel 15. For example, the first fuel compartment 62 may be disposed at a free space between a right front wheel and a right rear wheel of the construction machine 10. The second fuel compartment 64 may be also disposed between the first and second set of wheels 24 and 26 on a second side of the swivel 15 opposite to the first side. The first and second fuel compartments 62 and 64 may be fluidly connected to each other via the fuel passage 66 passing, for example, under the swivel 15.

In some embodiments, the fuel passage 66 may also pass around the swivel, i.e. the fuel passage 66 may encompass the swivel, thereby fluidly interconnecting the first and second fuel compartment 62 and 64. The fuel passage 66 may be further protected with, for example, a fender from the rough terrain, for example stones, earth, or debris, over which the construction machine 10 may travel.

As already mentioned above, the construction machine 10 is not limited to a wheel excavator as shown in FIG. 1. The arrangement of the first and second fuel compartments 62 and 64 may be also applicable to track-type excavators, where the first and second fuel compartments 62 and 64 may be disposed between the upper and lower tracks on each side of the swivel.

As further shown in FIG. 2, the construction machine 10 may further comprise a second fuel tank 100 disposed at the superstructure 14. The second fuel tank 100 may be fluid interconnected between the first fuel tank 60 and the internal combustion engine 12. The second fuel tank 100 may be configured to serve as a fuel accumulator, which means that the second fuel tank 100 may buffer fuel.

The second fuel tank 100 may further compensate fuel feeding unsteadiness during operation of the internal combustion engine 12 and may provide fuel for the engine start. Furthermore, in case of a malfunction of the fuel supply from the first fuel tank 60 to the second fuel tank 100, the second fuel tank 100 may provide fuel to the internal combustion engine 12, such that the construction machine 10 may be able leave the worksite to have maintenance.

The second fuel tank 100 may comprise a first fuel partition 110 and a second fuel partition 120 disposed above the first fuel partition 110. The first fuel partition 110 may define a third convex volume including a most upper point. The second fuel partition 120 may define a fourth convex volume including a most upper point. The second fuel tank 100 may further comprise a fluid passage 116 fluidly connecting the most upper point of first fuel partition 110 to the most upper point of the second fuel partition 120.

The first fuel partition 110 may include a bottom wall 112, at least two side walls 114A and 114B, and an inclined upper wall 118 opposite to the bottom wall 112. As FIG. 2 shows a cross-sectional view of the second fuel tank, two further side walls (not shown) may be positioned in front and behind the drawing area, respectively.

The inclination of the inclined upper wall 118 of the first fuel partition 110 may rise towards the fluid passage 116 such that the fluid passage 116 may be fluidly connected to the most upper point of the first fuel partition 110. For example, according to FIG. 2, the inclined upper wall 118 may smoothly rise from the right side wall 114B to the left side wall 114A. In some embodiments, the inclined upper wall 118 may include any configuration suitable for enabling the entire gaseous fluids to freely rise to the most upper point of the first fuel partition 110 without being trapped. There, the entire gaseous fluids may be collected and the entire gaseous fluids may enter the fluid passage 116.

The fluid passage 116 may include a cuboid shape. For instance, the fluid passage 116 may include any other suitable cross-section, such as a circular cross-section, a rectangular cross-section, and an oval cross section, etc. However, the fluid passage 16 may be provided in any suitable inclined shape which may ensure gaseous fluids to completely rise through the entire fluid passage 116 into the second fuel partition 120.

The second fuel partition 120 may comprise a substantially rectangular cross-section which may be defined by a bottom wall 122, two side walls 124A and 124B, and an upper side wall 126. As already mentioned above, FIG. 2 shows a cross-sectional view of the second fuel tank 100. Hence, the second fuel partition 120 may comprise two further side walls rendering the second fuel partition 120 in a closed volume. The two further side walls may be positioned in front and behind the drawing area, respectively, and are not shown in FIG. 2. The fluid passage 116 may be fluidly connected to the most upper point of the second fuel partition 120, for instance, the left side wall 124A, as illustrated in FIG. 2.

The inclined upper wall 118 of the first fuel partition 110 may be configured to guide gaseous fluids contained within the first fuel partition 110 to the most upper point of the first fuel partition 110. There, the gaseous fluids may enter the fluid passage 116 which may be also inclined for enabling the gaseous fluids to further rise into the second fuel partition 120. In some embodiments, the inclination of the fluid passage 116 and the inclined upper wall 118 may be in an angular range of 0° and 50°, preferably in an angular range of 5° to 35°, with respect to a horizontal axis.

The first fuel partition 110 may comprise a fuel outlet 134 being fluidly connected to a common rail 13 of the internal combustion engine 12 via a first fuel supply line 180. A fuel pump 160 may be configured to pump fuel from the first fuel partition 110 to the common rail 13 via the first supply line 180. The fuel supplied to the common rail 13 by the fuel pump 160 may comprise a first fuel temperature of, for example, at maximum 80° C., which may be suitable for being combusted within the internal combustion engine 12 in an optimized manner.

The second fuel partition 120 may comprise a fuel inlet 136 being fluidly connected to the common rail 13 via a second fuel supply line 182. The second fuel partition 120 may be configured to receive fuel excessively supplied to the common rail 13. The reflowing fuel may comprise a second fuel temperature, for example 100° C. Due to, for example, the combustion process of the internal combustion engine 12, the second fuel temperature may be higher than the first fuel temperature.

As used herein, the fuel within the first fuel partition 110 may be referred to as "cool fuel", wherein the fuel received by the second fuel partition 120 may be referred to as "warm fuel".

The first fuel partition 110 may further comprise a fuel inlet 132, and the second fuel partition 120 may further comprise a fuel outlet 138 being disposed at the most upper point of the second fuel partition 120. The fuel inlet 132 of the first fuel partition 110 of the second fuel tank 100 may be fluidly connected to a fuel outlet 222 of the first fuel compartment 62 of the first fuel tank 60 via a first fuel line 140, which may pass through the swivel 15. The first fuel line may be configured to reach the most lower point of the first fuel compartment 62, such that the total amount of fuel within the fuel tank 60 may be accessible. The fuel outlet 138 of the second fuel partition 120 of the second fuel tank 100 may be fluidly connected to a fuel inlet 224 of the second fuel compartment 64 of the first fuel tank 60 via a second fuel line 142, which may also pass through the swivel 15. A further fuel pump 162 may be configured to pump fuel from the second fuel partition 120 of the second fuel tank 100 into the second fuel compartment 64 of the first fuel tank 60 through the swivel via the second fuel line 142.

A main fuel pump 270 may be configured to pump fuel from the first fuel compartment 62 of the first fuel tank 60 to the first fuel partition 110 of the second fuel tank 100 via the first fuel line 140. The main fuel pump 270 may be disposed at the undercarriage 16 of the construction machine 10. In some embodiments, the main fuel pump 270 may be also arranged at the superstructure 14 of the construction machine 10.

For ensuring that the fuel within the second fuel tank 100 may not reflow into the main reservoir during, for example, a standstill of the construction machine 10, the main fuel pump 270 may include a check valve.

The warm fuel pumped from the second fuel partition 120 of the second fuel tank 100 into the second fuel compartment 64 of the first fuel tank 60 may pass a first fuel cooler 150 which may be configured to cool the warm fuel. Hence, after passing the fuel cooler 150, the temperature of the warm fuel may be approximately the same as the temperature of the cool fuel stored in the first fuel tank 60. After being pumped into the second fuel compartment 64, the fuel may mix with the fuel stored in the first fuel tank 60.

The first fuel partition 110 of the second fuel tank 100 may define the third convex volume, wherein the second fuel partition 120 of the second fuel tank 100 may define the fourth convex volume which may be substantially smaller than the first convex volume of the first fuel partition 110.

In some embodiments, the fourth convex volume of the second fuel partition 120 may be equal to about 40% or less of the third convex volume of the first fuel partition 110, and equal to about 5% or more of the third convex volume of the first fuel partition 110. Preferably, the fourth convex volume of the second fuel partition 120 may be equal to about 30% or less of the third convex volume of the first fuel partition 110, and equal to about 10% or more of the third convex volume of the first fuel partition 110. For example, the first fuel partition 110 may comprise a third convex volume of about 20 l, whereas the second fuel partition 120 may comprise a fourth convex volume of about 3 l.

By providing the second fuel tank 100 comprising two separated but interconnected fuel partitions 110 and 120, mixing of cool fuel with warm fuel within the second fuel tank 100 may be prevented. This may ensure that the fuel supplied from the first fuel partition 110 of the second fuel tank 100 to the common rail 13 may have a desired temperature suitable for being combusted within the internal combustion engine 12. Hence, heating of the fuel within the second fuel tank 100 may be prevented.

The warm fuel being pumped from the second fuel partition 120 of the second fuel tank into the second fuel compartment 64 of the first fuel tank 60 may further pick up the gaseous fluids risen from the first and second fuel partitions 110 and 120 to the most upper point of the second fuel partition 120. This may vent the second fuel tank 100. Then, the gaseous fluids may be vented at the first fuel tank 60, namely via the vent line 228 and the vent valve 230 at the first fuel tank 60. This may render an additional vent device at the second fuel tank 100 superfluous.

In some embodiments, a second fuel cooler 152 may be provided between the common rail 13 and the fuel inlet 136 of the second fuel partition 120 for pre-cooling the warm fuel.

One should note that the scale of FIG. 2 may not represent real measures of the sizes of, for example, the first and second fuel tanks 60 and 100. Rather, it should be understood that the first fuel tank 60 may comprise a total volume being much higher than the total volume of the second fuel tank 100. For example, the total volume of the second fuel tank 100 including the first and second fuel partitions 110 and 120 may be equal to about 20% or less of the total volume of the first fuel tank 60. For example, the second fuel tank 100 may comprise a total volume of about 15 to 25 l, whereas the total volume of the first fuel tank 60 may be about 380 l to 400 l.

As already described above, the warm fuel received by the second fuel partition 120 of the second fuel tank 100 may be continuously further supplied to the second fuel compartment 64 of the first fuel tank 60. As the gaseous fluids may further rise to the most upper point of the second fuel partition 120, the excessive warm fuel from the common rail 13 may pick up the gaseous fluids such that the gaseous fluids may also be pumped into the first fuel tank 60, where the gaseous fluids may be vented via the vent line 228 and vent valve 230. Hence, the process of pumping warm fuel together with gaseous fluids from the second fuel partition 120 of the fuel tank 200 into the second fuel compartment 64 of the first fuel tank 60 may "vent" the fuel tank 200.

In some embodiments, the construction machine 10 may be only provided with the first fuel tank 60. In such embodiments, the main fuel pump 270 may be configured to pump fuel from the first fuel compartment 62 of the first fuel tank 60 directly into the fuel rail 13. Thus, no fuel accumulator as the second fuel tank 100 may be provided.

Referring to FIG. 3, a further embodiment of a fuel tank 360 is shown. The fuel tank 360 may also be a sectioned fuel tank, as already indicated in FIG. 2. Thus, the fuel tank 360 may comprise a first fuel compartment 362 defining a first convex volume including a most lower point, and a second fuel compartment 364 defining a second convex volume also including a most lower point. The second fuel compartment 364 may be disposed beside the first fuel compartment 362. Furthermore, the most lower point of the second fuel compartment 364 may be disposed superior to the most lower point of the first fuel compartment 362, i.e. the most lower point of the second fuel compartment 364 may be disposed at higher altitudes than the most lower point of the first fuel compartment 362.

The first fuel compartment 362 may be fluidly connected to the second fuel compartment 364 via a fuel passage 366. The fuel passage 366 may be configured to fluidly connect the most lower point of the second convex volume of the second fuel compartment 364 to the first fuel compartment, such that fuel within the second fuel compartment 364 may be able to drain into the first fuel compartment 362 due to, for example, the gravitational force. The fuel passage 366 may, therefore, configured to level the fuel amounts of the first and second fuel compartments 362 and 364.

In some embodiments, the first fuel compartment 362, the second fuel compartment 364, and the fuel passage 366 may form together a one-piece fuel tank 360.

The first and second fuel compartments 362 and 364 are shown in FIG. 3 in a manner, where the upper surface of the first compartment 362 may be at a same level as the upper surface of the second fuel compartment 364. Thus, for enabling fuel to drain out of the second fuel compartment 364, the height of the second fuel compartment 364 may be smaller than the height of the first fuel compartment 362.

In some embodiments, the first and second fuel compartments 362 and 364 may comprise the same height. Hence, the upper surfaces of the first and second fuel compartments 362 and 364 may not be at the same level, i.e. the upper surface of the second fuel compartment 364 may be higher than the upper surface of the first fuel compartment 362.

As shown in FIG. 3, the fuel passage 366 may be provided in an inclined manner. This may ensure the fuel within the second fuel compartment 362 to freely drain from the second fuel compartment 364 into the first fuel compartment 362. In some embodiments, the fuel passage 366 may be configured to fluidly connect the most lower point of the second convex volume of the second fuel compartment 364 to the most lower point of the first convex volume of the first fuel compartment 362.

In some embodiments, the second convex volume of the second fuel compartment 364 may be substantially smaller than the first convex volume. For example, the second convex volume of the second fuel compartment 364 may be equal to about 90% or less of the first convex volume of the first fuel compartment 362, and equal to about 60% or more of the first convex volume of the first fuel compartment 362. For instance, the first fuel compartment 362 may comprise a first convex volume of about 250 l, whereas the second fuel compartment 364 may comprise a second convex volume of about 150 l.

The fuel passage 366 may include a cuboid shape. For instance, the fuel passage 366 may also include any other suitable cross-section, such as a circular cross-section, a rectangular cross-section, an oval cross section, etc. However, the fuel passage 366 may be further provided in any suitable inclined shape which may ensure liquid fuel to completely flow through the fuel passage 366 into the first fuel compartment 362.

The flowing speed of the fuel draining from the second fuel compartment into the first fuel compartment may be controlled by adjusting the diameter of the fuel passage 366 and/or by adjusting the angle of inclination of the fuel passage 366.

The second fuel compartment 364 may be provided with a filler neck 326 for refueling the second fuel compartment 364 and, more specifically, the first fuel tank 360 with fuel. The first fuel compartment 362 may further be fluidly connected to the second fuel compartment 364 via a vent line 328. The vent line 328 may be connected to most upper points of the first and second convex volumes of the first and second fuel compartments 362 and 364, respectively. The vent line 328 may be further connected to a vent valve 330 configured to release gaseous fluids out of the first fuel tank 360. The vent line 328 may be easily installed with quick connectors, crimp connectors, threaded ports, or any other suitable connection known in the art.

As indicated in FIG. 3, the first and second fuel compartments 362 and 364 may be arranged at the undercarriage 16 of the construction machine 10. The first fuel compartment 362 may be arranged between the first and second set of wheels 24 and 26 on a first side of the swivel 15. For example, the first fuel compartment 362 may be disposed at a free space between a right front wheel and a right rear wheel of the construction machine 10. The second fuel compartment 364 may be also disposed between the first and second set of wheels 24 and 26 on a second side of the swivel 15 opposite to the first side. The first and second fuel compartments 362 and 364 may be fluidly connected to each other via the fuel passage 366 passing, for example, under the swivel 15.

In some embodiments, the fuel passage 66 may also pass around the swivel, i.e. the fuel passage 66 may encompass the swivel, thereby fluidly interconnecting the first and second fuel compartment 62 and 64. The fuel passage 66 may be further protected with, for example, a fender from the rough terrain, for example stones, earth, or debris, over which the construction machine 10 may travel.

In some embodiments, the fuel tank 360 may also be provided only with one of the first or fuel compartments 362 or 364. In such embodiment, the fuel tank 360 may be arranged at one side of the swivel between the first and second set of wheels 24 and 26.

As already mentioned above, the construction machine 10 is not limited to a wheel excavator as shown in FIG. 1. The arrangement of the first and second fuel compartments 62 and 64 may be also applicable to track-type excavators, where the first and second fuel compartments 62 and 64 may be disposed between the upper and lower tracks on each side of the swivel.

As further indicated in FIG. 3, the fuel tank 360 may include stairs configured to help the operator to get into the operator station 22. The stairs may include at least one step integrally formed with the first fuel compartment 362. As shown in FIG. 3, the at least one step 370 may be fillable with fuel.

As mentioned above, the fuel tank 360 may be arranged at the undercarriage 16 of the construction machine 10 and between the first and second set of wheels 24 and 26. Thus, the at least one step 370 of the fuel tank 360 may be disposed on a side on which the entrance of the operator station 22 is located. An operator arriving at the construction machine and intending to enter the operator station may be able to step onto the at least one step 370 for entering the operator station and, therefore, the operator's seat 52.

For protecting the at least one step 370 from any damage caused by, for example, an operator stepping onto the same, the at least one step 370 may be covered with a metallic protection, such as a metallic sheet. Furthermore, the metallic sheet and/or the at least one step may comprise an anti-sliding surface for ensuring that the operator may stand safety on the at least one step 370. The anti-sliding surface may comprise, for example, riffles integrally formed with the at least one step 370 or the metallic protection.

It should be understood that the at least one step 370 may further fulfill the requirement of rendering the first fuel compartment 360 still comprising a convex volume, as the at least one step 370 may comprise a profile having a strictly monotonically increasing shape. The fuel tank 360 of FIG. 3 may comprise three steps. In some embodiments, the fuel tank 360 may comprise two steps or more than three steps.

The first and second fuel tanks 60 and 100 may be comprised of a moldable material, such as plastics. For example, the first and second fuel tanks 60 and 100 may be comprised of polyethylene.

INDUSTRIAL APPLICABILITY

In the following, operation of a construction machine, such as a wheel excavator, may be described with reference to FIGS. 1 to 3.

During operation of the construction machine 10, the fuel pump 160 may supply cool fuel from the first fuel partition 110 of the second fuel tank 100 to the fuel rail 13, which may in turn supply fuel to the internal combustion engine 12, where the fuel may be combusted.

For refueling the first fuel partition 110 of the second fuel tank 100, the main fuel pump 270 may simultaneously and continuously supply fuel from the first fuel compartment 62 of the first fuel tank 60 to the first fuel partition 110 of the second fuel tank 100 via the first fuel line 240.

Excessively supplied fuel to the fuel rail 13 may flow into the second fuel partition 120 of the second fuel tank 100. Due to the combustion environment within the internal combustion engine 10, the fuel within the common rail 13 may be heated. Thus, the fuel received by the second fuel partition 120 may have a temperature being higher than the cool fuel temperature.

With the specific disclosed design of the second fuel tank 100, mixing of the cool fuel and the warm fuel within the second fuel tank 100 may be prevented. In some embodiments, a second fuel cooler 152 may be provided between the common rail 13 and the fuel inlet 136 of the second fuel partition 120. The second fuel cooler 152 may be configured to pre-cool the warm fuel before entering the second fuel partition 120.

The fuel supplied by the main fuel pump 270 to the first fuel partition 110 may contain gaseous fluids. Due to the inclined upper wall 118 of the first fuel partition 110, the gaseous fluids may rise to the most upper point of the first fuel partition 110, to which the inclined fluid passage 116 may be fluidly connected. After rising to the most upper point of the first fuel partition 110, the gaseous fluids may further rise through the fluid passage 116 into the second fuel partition 120, and then to the most upper point of the second fuel partition 120.

The warm fuel flowing from the common rail 13 into the second fuel partition 120 may be configured to be further pumped back into the first fuel tank 60, particularly into the second fuel compartment 64. The reflowing warm fuel may mix with and pick up the gaseous fluids risen to the most upper point of the second fuel partition and may both together flow back into the second fuel compartment 64 of the first fuel 60. There, the gaseous fluids may be vented via the vent line 228 and the vent valve 230. While flowing through the second fuel line 242, the fuel may be cooled by the first fuel cooler 150.

Different fuel levels of the first and second fuel compartments 62 and 64 may be compensated by the fuel passage 66. The fuel passage 66 may fluidly connect the most lower point of the second fuel compartment 64 to the first fuel compartment 62. Therefore, only one filler neck 226 may be necessary for fuelling the first fuel tank 60, specifically the first and second fuel compartments 62 and 64.

Referring especially to FIG. 2, the second fuel tank 100 disposed at the superstructure of the construction machine 10 may serve as fuel accumulator. The second fuel tank 100 may provide fuel for starting the internal combustion engine 12. Furthermore, in the case of a malfunction of, for example, the main fuel pump 270, the construction machine 10 may still be able to, for instance, leave the work site and having maintenance of the main fuel pump 270. Additionally, as the first fuel tank 60 comprising the majority fuel volume may be arranged at the undercarriage 16, fuelling of the first fuel tank 60 may be facilitated, as an operator may stand on the ground and may fuel the first fuel tank 60 via the filler neck 226.

When the construction machine may operate, the main fuel pump 270 may pump a fuel amount to the second fuel tank 100, which may be substantially higher than the fuel amount provided from the second fuel tank 100 to the internal combustion engine 10. Thus, the second fuel tank 100 may be continuously filled with fuel and may not get empty.

Additionally, with reference to FIG. 3, the fuel tank 360 may serve as stairs configured to help an operator to get into the operator station 22. For entering the operator station 22, the operator may step onto the fuel tank 360 having at least one step 370 integrally formed with the fuel tank 360, particularly, for example, with the first fuel compartment 362.

Although the preferred embodiments of this invention have been described herein, improvements and modifications may be incorporated without departing from the scope of the following claims.

The invention claimed is:

1. A construction machine comprising: an undercarriage;
    a superstructure comprising an internal combustion engine;
        a swivel configured to rotatably mount the superstructure onto the undercarriage;
        a first fuel tank disposed at the undercarriage, the first fuel tank comprising:
            a first fuel compartment defining a first convex volume including a most lower point, the first fuel compartment being configured to provide fuel to the internal combustion engine;
            a second fuel compartment defining a second convex volume including a most lower point, the second fuel compartment being configured to receive excessive fuel from the internal combustion engine; and
            a fuel passage configured to fluidly connect the most lower point of the second convex volume to the first convex volume, such that fuel within the second fuel compartment is enabled to drain the second fuel compartment into the first fuel compartment; and
    a second fuel tank disposed at the superstructure and being fluidly interconnected between the first fuel tank and the internal combustion engine, the second fuel tank comprises:
        a first fuel partition defining a third convex volume including a most upper point, and being configured to provide fuel having a first fuel temperature to the internal combustion engine;
        a second fuel partition defining a fourth convex volume including a most upper point, the second fuel partition being disposed above the first fuel partition and being configured to receive excessive fuel from the internal combustion engine, the excessive fuel having a second fuel temperature being higher than the first fuel temperature; and
        a fluid passage configured to fluidly connect the most upper point of the first fuel partition to the most upper point of the second fuel partition.

2. The construction machine according to claim 1, wherein the fuel passage is configured to fluidly connect the most lower point of the second convex volume of the second fuel compartment to the most lower point of the first convex volume of the first fuel compartment.

3. The construction machine according to claim 1, wherein the first fuel compartment comprises a first height, and the second fuel compartment comprises a second height being smaller than the first height.

4. The construction machine according to claim 1, wherein the second convex volume of the second fuel compartment is smaller than the first convex volume of the first fuel compartment.

5. The construction machine according to claim 1, further comprising:
    a vent line fluidly connected to most upper points of the first fuel compartment and the second fuel compartment; and
    a vent valve being disposed at the vent line and being configured to vent the first fuel compartment and the second fuel compartment.

6. The construction machine according to claim 1, wherein at least one of the first fuel compartment and the second fuel compartment comprises at least one step integrally formed with the at least one of the first fuel compartment and the second fuel compartment, the at least one step being configured to facilitate entrance into the operator station of the construction machine.

7. The construction machine according to claim 6, wherein the at least one step is covered with an anti-sliding surface.

8. The construction machine according to claim 7, wherein the anti-sliding surface comprises riffles integrally formed with the at least one step.

9. The construction machine according to claim 1, wherein the first fuel compartment of the first fuel tank is fluidly connected to the first fuel partition of the second fuel tank, and the second fuel compartment of the first fuel tank is fluidly connected to the second fuel partition of the second fuel tank.

10. The construction machine according claim 1, further comprising a main fuel pump disposed at the undercarriage and configured to pump fuel from the first fuel compartment of the first fuel tank into the first fuel partition of the second fuel tank.

\* \* \* \* \*